(12) United States Patent
Yoshioka

(10) Patent No.: US 11,555,584 B2
(45) Date of Patent: Jan. 17, 2023

(54) DECORATIVE ELONGATED OBJECT, METHOD FOR MANUFACTURING DECORATIVE ELONGATED OBJECT, OLYMPIC TORCH, AND LIGHTING DEVICE

(71) Applicant: TOKUJIN YOSHIOKA INC., Tokyo (JP)

(72) Inventor: Tokujin Yoshioka, Tokyo (JP)

(73) Assignee: Tokujin Yoshioka Inc., Tokyo (JP)

( * ) Notice: Subject to any disclaimer, the term of this patent is extended or adjusted under 35 U.S.C. 154(b) by 306 days.

(21) Appl. No.: 16/858,661

(22) Filed: Apr. 26, 2020

(65) Prior Publication Data

US 2020/0309331 A1  Oct. 1, 2020

Related U.S. Application Data

(63) Continuation of application No. PCT/JP2018/039878, filed on Oct. 26, 2018.

(30) Foreign Application Priority Data

Oct. 27, 2017  (JP) .............................. JP2017-207988

(51) Int. Cl.
*F21L 17/00* (2006.01)
*F16S 1/08* (2006.01)
(Continued)

(52) U.S. Cl.
CPC ................. *F21L 17/00* (2013.01); *F16S 1/08* (2013.01); *F42B 4/26* (2013.01); *B21C 23/02* (2013.01); *B23P 15/00* (2013.01); *B44C 5/00* (2013.01)

(58) Field of Classification Search
CPC ..... F21L 17/00; F21L 4/00; F21L 4/04; F21V 35/00; F21V 35/003; F21V 29/745; F21V 29/773
See application file for complete search history.

(56) References Cited

U.S. PATENT DOCUMENTS 397,009 A * 1/1889 Leiss ......................... F42B 4/26
431/302
D209,318 S * 11/1967 Lisle ............................... D26/8
(Continued)

FOREIGN PATENT DOCUMENTS

CN    105135227 A  * 12/2015
CN    214223101 U  *  9/2021
(Continued)

OTHER PUBLICATIONS https://monogocoro.blogs pot.com/2011/02/coloure d-peter-vase. html (3 pages).
(Continued)

*Primary Examiner* — Alexander K Garlen
(74) *Attorney, Agent, or Firm* — Shlesinger, Arkwright & Garvey, LLP

(57) ABSTRACT

To provide an air passage for torch combustion in the torch main body to ensure the freedom of design. A decorative elongated object according to the present invention includes an elongated material (100) with a cross section having a plurality of radial lines (L2) and being uniform from one end (1*a*) to another end (1*b*), a cavity being formed at the center of the elongated material, in which the elongated material has a side surface at least partially tapered to be thinner toward the other end (1*b*) from the one end (1*a*), with the radial lines (L2) partially cut and removed along a side surface cutting plane intersecting with the side surface.

13 Claims, 10 Drawing Sheets

(51) Int. Cl.
*F42B 4/26* (2006.01)
*B44C 5/00* (2006.01)
*B21C 23/02* (2006.01)
*B23P 15/00* (2006.01)

(56) References Cited

U.S. PATENT DOCUMENTS

| | | | | |
|---|---|---|---|---|
| 3,364,704 | A | * | 1/1968 | Bernstein ................ F21S 13/10 |
| | | | | 431/126 |
| D225,083 | S | * | 11/1972 | Reese .............................. D26/8 |
| 2010/0213855 | A1 | * | 8/2010 | Huang ...................... F21L 4/04 |
| | | | | 362/257 |
| 2010/0315022 | A1 | * | 12/2010 | Schnitzer ............... H05B 45/00 |
| | | | | 362/183 |

FOREIGN PATENT DOCUMENTS

| | | | |
|---|---|---|---|
| JP | 2006-016920 A | | 1/2006 |
| JP | 2006-329305 A | | 12/2006 |
| JP | 2009-149307 A | | 7/2009 |
| JP | 2018-071896 A | | 5/2018 |
| JP | 2018071896 A | * | 5/2018 |
| WO | WO2016/051352 A2 | | 4/2016 |

OTHER PUBLICATIONS

International Preliminary Report Patentability dated Apr. 28, 2020 re PCT/JP2018/039878 (6 pages).
International Search Report English Translation dated Jan. 22, 2019 re PCT.JP2018/039878 (1 page).
International Written Opinion English Translation dated Jan. 22, 2019 re PCT/JP2018/039878 (7 pages).

* cited by examiner

DECORATIVE ELONGATED OBJECT, METHOD FOR MANUFACTURING DECORATIVE ELONGATED OBJECT, OLYMPIC TORCH, AND LIGHTING DEVICE

CROSS-REFERENCE TO RELATED APPLICATIONS

This application is a Continuation of International Patent Application No. PCT/JP2018/039878, filed Oct. 26, 2018, which 2 aims the benefit of Japanese Patent Application No. 2017-207988, filed Oct. 27, 2017, both of which are hereby incorporated by reference herein in their entirety.

BACKGROUND OF THE INVENTION

Field of the Invention

The present invention relates to a decorative elongated object having a tapered shape, a method for manufacturing the same, and an Olympic torch to be used for a torch relay or a lighting device.

Background Art

Conventionally, elongated objects formed by extrusion-molding an aluminum alloy or the like have been used for building materials such as sliding window frames and device structures such as motorcycle frames.

CITATION LIST

Patent Literature

Patent Literature 1: JP 2006-016920A
Patent Literature 2: JP 2009-149307A

Conventional extrusion-molded elongated objects have a functional form to be rails and guides (JP 2006-016920 A). In particular, extrusion-molded elongated objects have a uniform cross section continuing from one end to the other end. As a result, the elongated objects have a monotonous outer shape, and thus have not been used for decorative uses.

On the other hand, extrusion-molded elongated objects are used as structural materials in some cases, and a structure having a cavity in the center to reduce the weight has been proposed (JP 2009-149307 A), but again the appearance is simple and there has been no idea of using them as a decorative material.

In view of this, an object of the present invention is to provide a decorative elongated object, and an Olympic torch using the elongated object. The elongated object uses an elongated material having a cross section not changing between one end and the other end and having a side surface cut and removed to be in a tapered shape so that the side surface of the elongated object is patterned.

SUMMARY OF INVENTION

A typical configuration of a decorative elongated object according to the present invention for achieving the above-described object includes an elongated material with a cross section having a plurality of radial lines, and being uniform from one end to the other end, in which the elongated material has a side surface at least partially tapered to be thinner toward the other end from the one end, with the radial lines partially cut and removed along a side surface cutting plane intersecting with the side surface.

A method for manufacturing a decorative elongated object that is at least partially tapered includes: molding, by extrusion molding, an elongated material having a cross section having a plurality of radial lines; and cutting and removing a side surface of the elongated material, the cutting being performed in an angled direction with respect to the side surface.

Furthermore, there is provided an Olympic torch including a fuel unit that lights Olympic fire, the fuel unit being fixed at one end that is a wider side of the tapered shape in a cavity of the decorative elongated object.

Furthermore, there is provided a lighting device including a lighting unit that lights Olympic fire, the lighting unit being fixed at one end that is a wider side of the tapered shape in a cavity of the decorative elongated object.

Further features of the present invention will become apparent from the following description of exemplary embodiments with reference to the attached drawings.

DESCRIPTION OF THE EMBODIMENTS

Figure 1A:
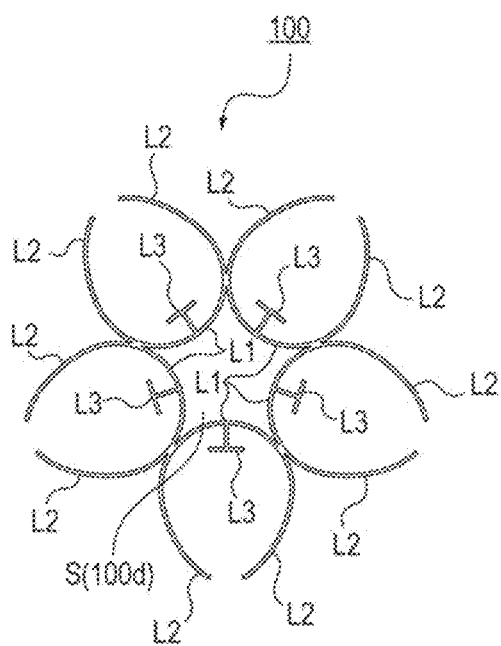
FIGS. 1A and 1B are diagrams illustrating an elongated material of a first embodiment of the present invention.
Figure 1B:
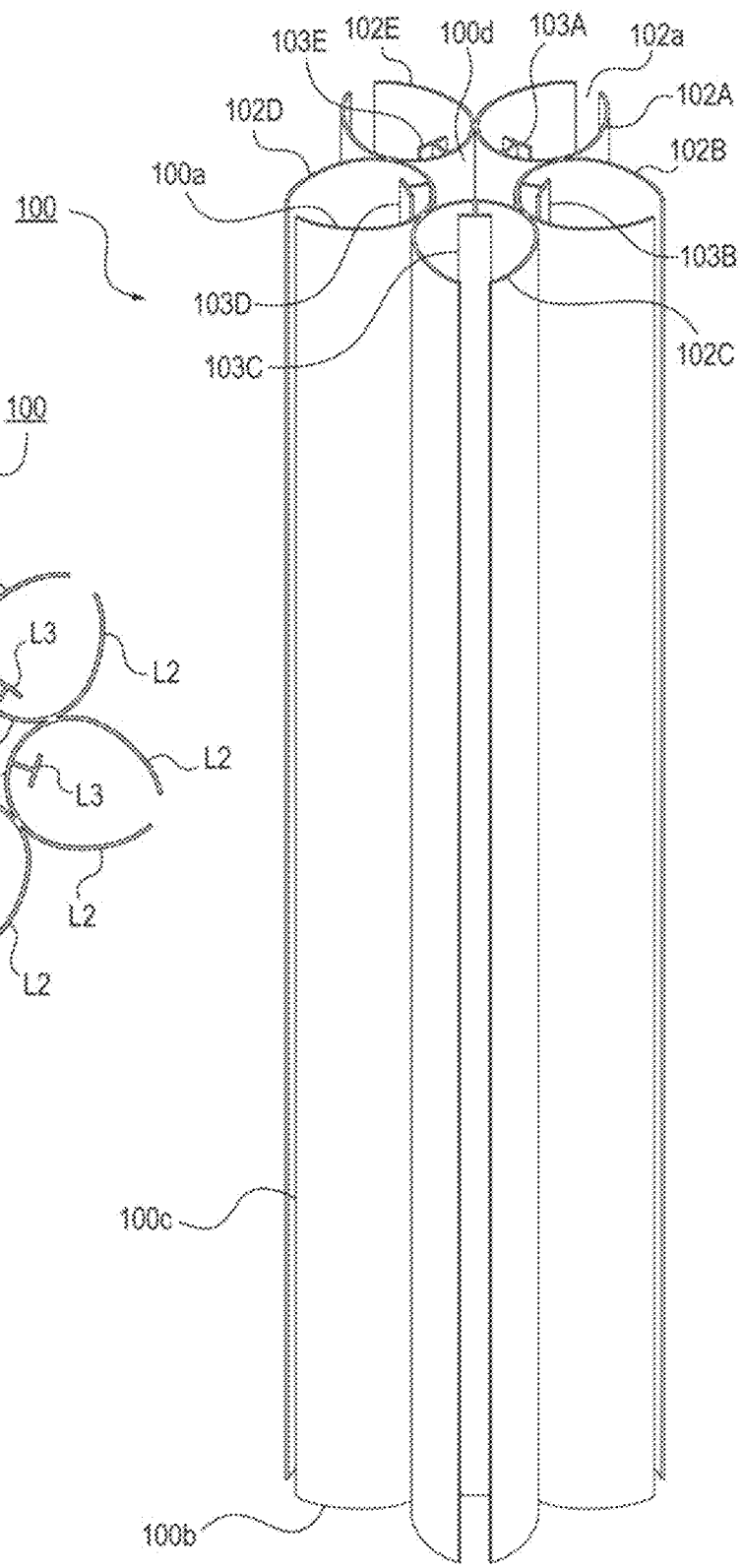
Figure 2:
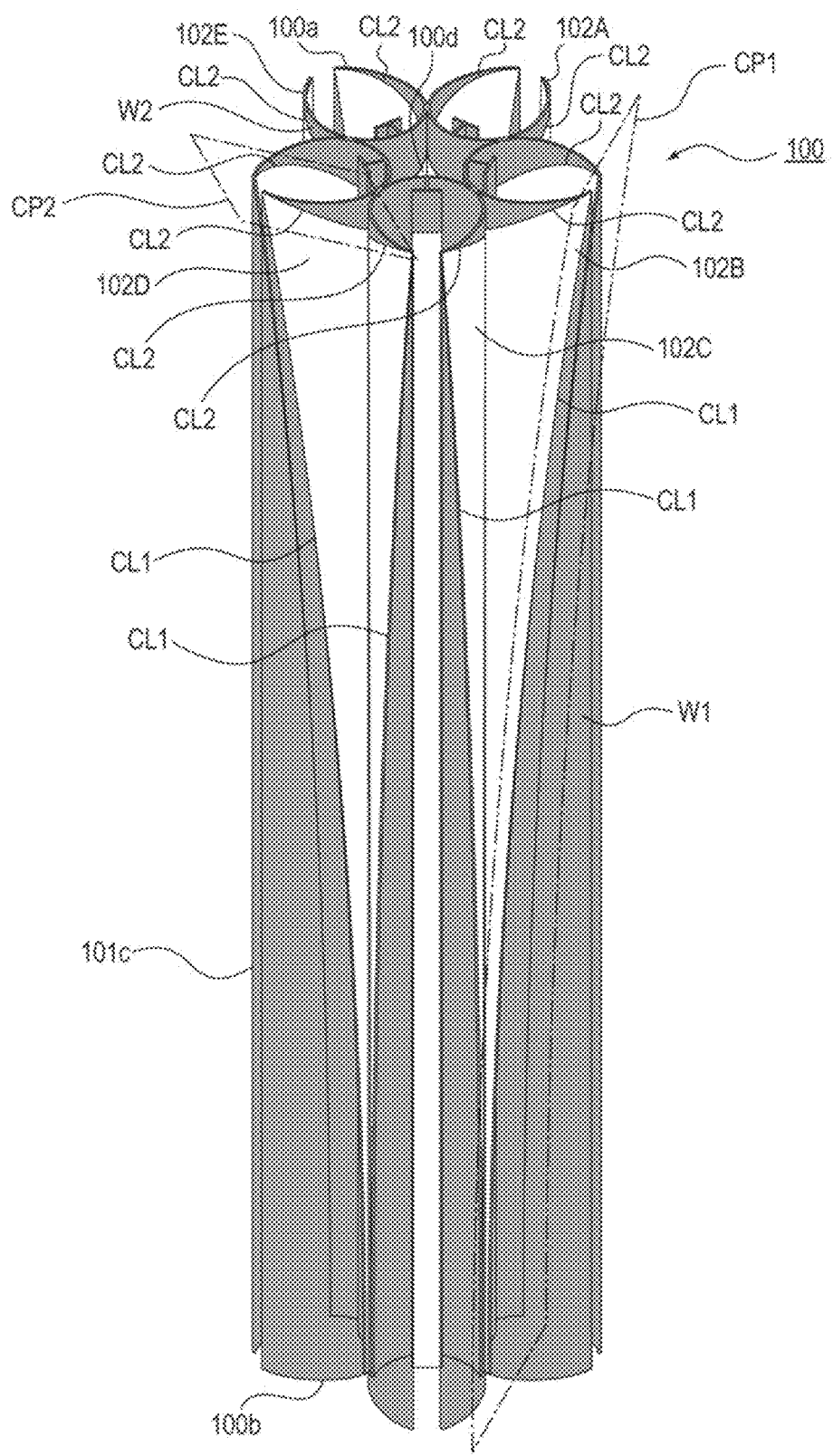
FIG. 2 is a perspective view illustrating a method of cutting the elongated material of the first embodiment of the present invention.
Figure 3:
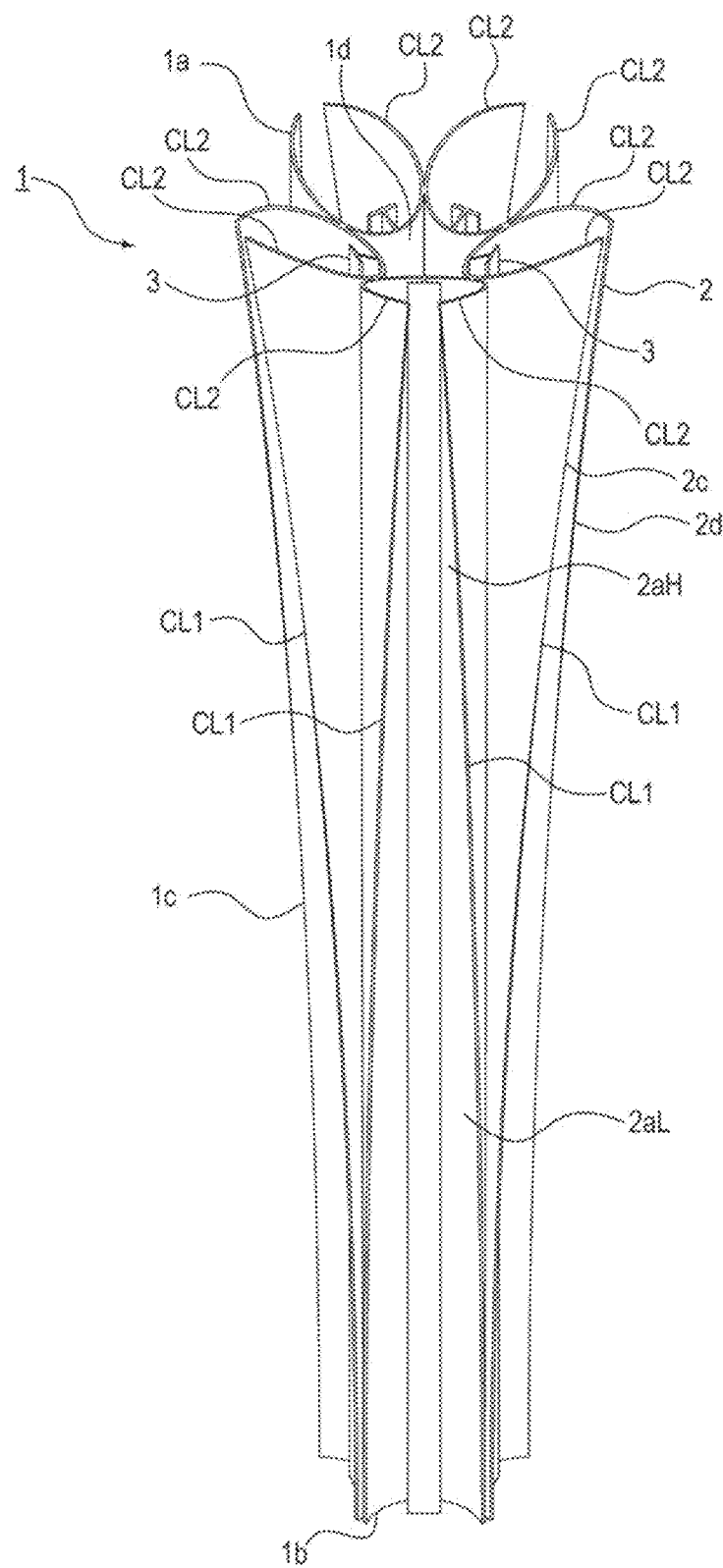
FIG. 3 is a perspective view of a decorative elongated object of the first embodiment of the present invention.

A first embodiment of a decorative elongated object of the present invention will be described below with reference to FIGS. 1A to 3. FIG. 1A illustrates a cross section of an elongated material according to the first embodiment of the present invention, and FIG. 1B is a perspective view of the elongated material. FIG. 2 is a perspective view illustrating a cutting method for manufacturing a decorative elongated object using the elongated material, and FIG. 3 is a perspective view of the manufactured decorative elongated object.

As illustrated in FIG. 1A, the cross section of an elongated member 100 used for processing includes closed lines L1 defining a central space S, and 10 radial lines L2 extending radially outward from the closed lines L1. The radial lines L2 are curved so that the distance between two adjacent ones of the radial lines L2 changes toward the outer side from the center in such a manner that the distance between the adjacent lines decreases toward the tips.

Further T-shaped radial lines L3 are each formed on the inner side of a corresponding pair of radial lines L2 facing each other. Thus, the cross section has a shape like five petals, formed by the radial lines L2 and L3, radially arranged around the center space S.

FIG. 1B is a perspective view of the elongated material 100 obtained by molding metal. For example, the material is manufactured by extrusion-molding aluminum material using a die, and the cross section as illustrated in FIG. 1A continues from one end 100a to the other end 100b.

As described above, in the cross section, the space S is formed at the center. With a hollow dice, extrusion molding can be performed to form the space S inside.

The cross section as illustrated in FIG. 1A continues, so that the elongated material 100 has five cylindrical sections 102A to 102E in back to back arrangement, with the cylindrical sections 102A to 102E having inner sides respectively provided with plate sections 103A to 103E all of which are integrally formed. The cylindrical sections 102A to 102E each have a tip provided with a slit 102a that is a strip-shaped opening. Thus, the elongated material 100 has a side surface 100c provided with the five slits 102a. Furthermore, a cavity 100d in which the space S defined by the cylindrical sections 102A to 102E continues is formed.

Next, the cutting operation of the elongated material 100 will be described with reference to FIG. 2. As illustrated in FIG. 2, side surface cutting planes CP1, intersecting with the side surface 100c of the elongated material 100, are set. Then, gray parts are cut along the cutting planes CP1 with an NC device or the like using an end mill.

Each side surface cutting plane CP1 extends at a predetermined angle to cross the side surface 100c of the elongated material 100. Thus, the elongated material 100 after the cutting has a shape that is tapered from one end 100a to the other end 100b. These side surface cutting planes CP1 are set so as to intersect with the upper ends of the slits 102a of the cylindrical sections 102A to 102E.

Also, at this time, the side surface cutting planes CP are planes that are curved to have an angle, with respect to the side surface 100c of the elongated material 100 that is large at one end 100a and smaller on the other end 100b side. Thus, the tapered shape is formed with a diameter being larger on the one end 100a side than on the other end 100b side.

These side surface cutting planes CP1 are set so as to intersect with the upper ends of the slits 102a of the cylindrical sections 102A to 102E. As described above, the cylindrical sections 102A to 102E are formed by the radial lines L2 with the distance therebetween changing toward the outer side from the center in the cross section. Thus, cutting lines CL1 that intersect with the side surface cutting planes CP1 having portions on the one end 100a side and the other end 100b side different from each other.

Therefore, each of the slits 102a of the cylindrical sections 102A to 102E has a shape that widens toward the other end 100b from one end 100a of the elongated material 100 due to the cutting lines CL1, whereby the cylindrical material 100 can have a varying outer appearance.

The cut portions obtained by the side surface cutting planes CP1 do not reach the cavity 100d, and a hole is provided at an intermediate portion of the cavity 100d or portions surrounding the cavity 100d remain, whereby the strength as a structural material would not be compromised.

Furthermore, one end 100a of the elongated material 100 is cut at an angle toward the center cavity 100d with end surface cutting planes CP2. Cutting lines CL2 at which the end surface cutting planes CP2 intersect with the cylindrical sections 102A to 102E are inclined toward the cavity 100d.

Therefore, on one end 100a of the elongated material 100, the opening of the cavity 100d is at a position depressed with respect to and surrounded by the five cylindrical sections 102A to 102E in its periphery.

FIG. 3 illustrates a decorative elongated object (member) 1 manufactured by the above-mentioned cutting. The appearance of the decorative elongated object 1 will be described in detail below.

The decorative elongated object 1 has a side surface 1c with a tapered overall shape with the diameter being large on the side of an upper end 1a as one end and being small on the side of a lower end 1b as the other end. The angle of this tapered shape is not uniform. Specifically, the angle is large on the upper end 1a side and smaller on the lower end 1b side.

In the center of the decorative elongated object 1, a cavity 1d with the circumference defined by five cylindrical sections 2 is formed. The upper ends of the five cylindrical sections 2 are defined by the cutting lines CL2 as a result of cutting at an angle toward the center, and the upper end of the cavity 1d is formed at the position depressed with respect to and surrounded by these cylindrical sections 5.

Slits 2a are formed at the outer ends of the five cylindrical sections 2, and the plate sections 3 formed inside can be seen through the slits 2a. The edges of the slit 2a are defined by the cutting lines CL1. The cutting lines CL1 as a result of cutting at an angle as described above are curved to reflect the distance between cylindrical section pieces 2b and 2c forming the cylindrical sections 2.

Thus, the form of the side surface 1c changes in the following manner. Specifically, a lower part 2aL of the slit 2a is wider than an upper part 2aH. Thus, the area of the plate section 3 and the inner surfaces of the cylindrical section pieces 2b and 2c that can be seen through the slit 2a increases toward the lower end 1b from the upper end 1a of the decorative elongated object 1. On the other hand, the area of the surfaces of the cylindrical section pieces 2b and 2c visible from the outside decreases toward the lower end 1b from the upper end 1a.

For example, regarding the coloring of the surface of the decorative elongated object, when the decorative elongated object is formed by molding an aluminum material for example, anodize painting can be provided on the surface so as to be durably decorated. Furthermore, masking may be performed so that colored portions can be selected. For example, when coloring is performed only on the inner side of the cylindrical section pieces 2b and 2c, as described above, the colored area viewable through the slit 2a changes toward the lower end 1b from the upper end 1a of the decorative elongated object 1. Thus, an object with excellent design, due to contrast between the colored and non-colored portions, can be obtained.

As described above, with the decorative elongated object and the manufacturing method thereof according to the present invention, the cutting lines CL1 and CL2 can be varied on the side surface and the upper end. Furthermore, the side surface can have a widely varying pattern. By preparing an elongated material 100 of various cross sections with the closed line L1 and the plurality of radial lines L defining the cross section, a decorative elongated object with a side surface having various decorative shapes can be obtained with a combination between the shape and the angle of the side surface cutting planes CL1.

In particular, if the elongated material 100 is manufactured by extrusion molding and is cut by an NC device, decorative elongated objects of the same shape can be produced in large quantities and at low cost. Also, it can be used as a base material for a construction material such as a column material or for a lighting device such as a streetlamp.

Figure 4:
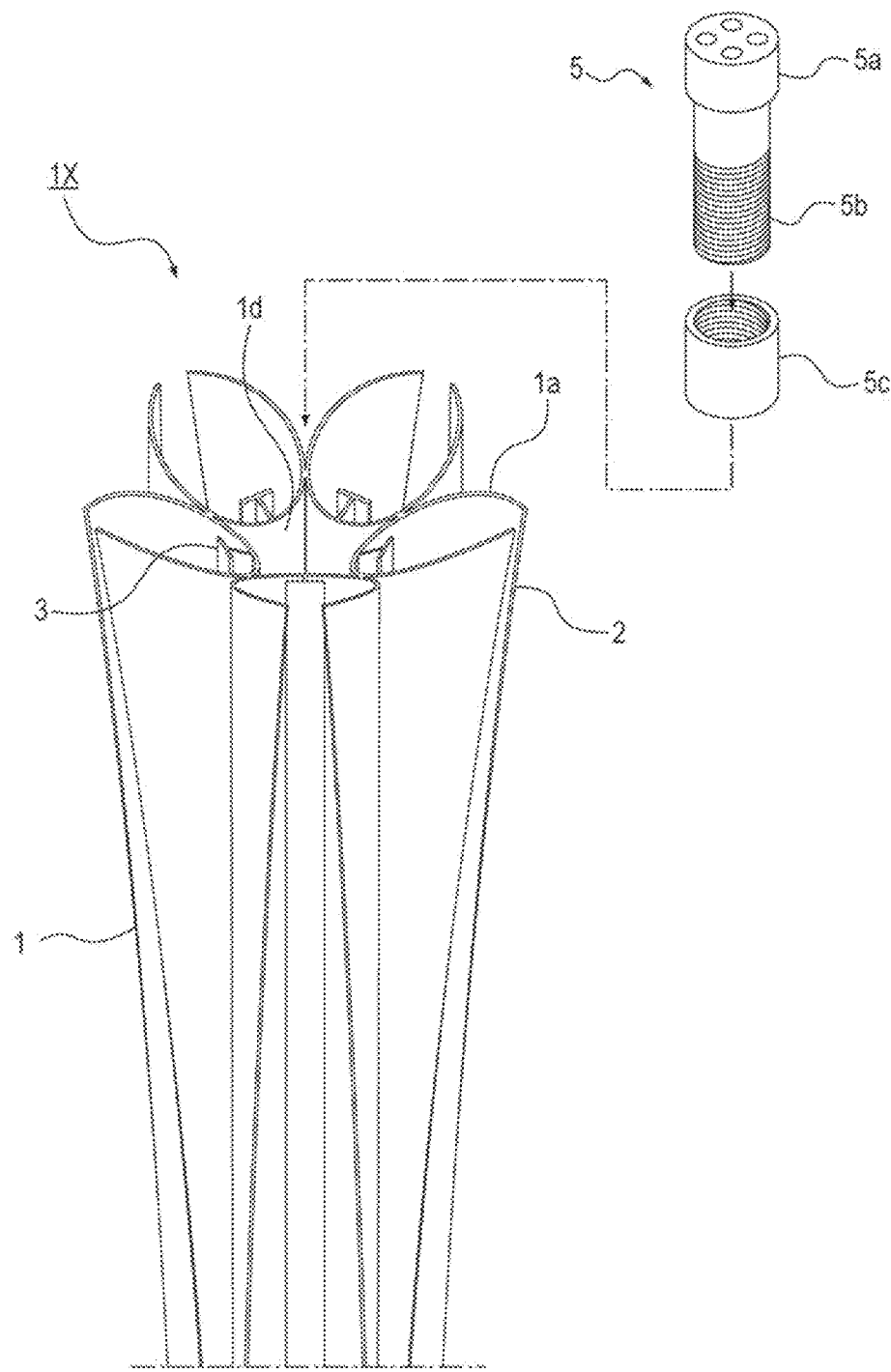
FIG. 4 is an exploded perspective view of an Olympic torch using the decorative elongated object of the first embodiment of the present invention.

With reference to FIG. 4, an Olympic torch formed using the decorative elongated object 1 of the present embodiment will be described. FIG. 4 is a partial perspective view of the upper end of the Olympic torch with a fuel unit separately illustrated.

An Olympic torch 1X is configured by attaching a fuel unit 5 to the cavity 1d at the upper end 1a of the decorative elongated object 1 described above.

The fuel unit 5 has a lighting section 5a at the upper end for igniting fuel, and includes a main body 5b for storing a combustible material such as natural gas, and a sleeve-shaped mount 5c screwed to the main body 5b. The mount 5c is fixed in the opening of the cavity 1d by welding or the like, and the main body 5b is fixed to the inner side of the mount 5c by a screw mechanism, whereby the Olympic torch 1X is formed.

As described above, the opening of the cavity 1d is arranged at a position to be depressed with respect to and to have the circumference surrounded by the five cylindrical sections 2, so that the lighting section 5a is less likely to be seen from the surroundings, and is less likely to be affected by wind and the like, in addition to the improvement of the design of the Olympic torch.

The cavity 1d extends from the lower end 1b (see FIG. 3) of the decorative elongated object 1 to the upper end 1a, air for combustion can always be supplied through the cavity 1d. Therefore, it is not necessary to open an air supply port on the side surface of the Olympic torch for supplying air, whereby the Olympic torch with excellent design can be similarly obtained.

As described above, the main body 5b is screwed into the mount 5c, whereby the position of the lighting section 5a can be changed by a screw mechanism, so that the torch is less likely to be affected by environmental changes such as wind and rain. Furthermore, a configuration may be employed in which the combustion amount is adjusted with an air supply adjustment valve for combustion or an electric fan disposed inside the cavity 1b.

For the Olympic Games, many Olympic torches are used by many torch runners over several months. In this context, for example, a plurality of Olympic torches 1X may be prepared to have slightly different angles of the side surface cutting plane of the decorative elongated objects 1 used therefor. Thus, the Olympic torch 1X can be shown in varying shapes to indicate the countdown to the opening of the Olympic games.

Figure 5:
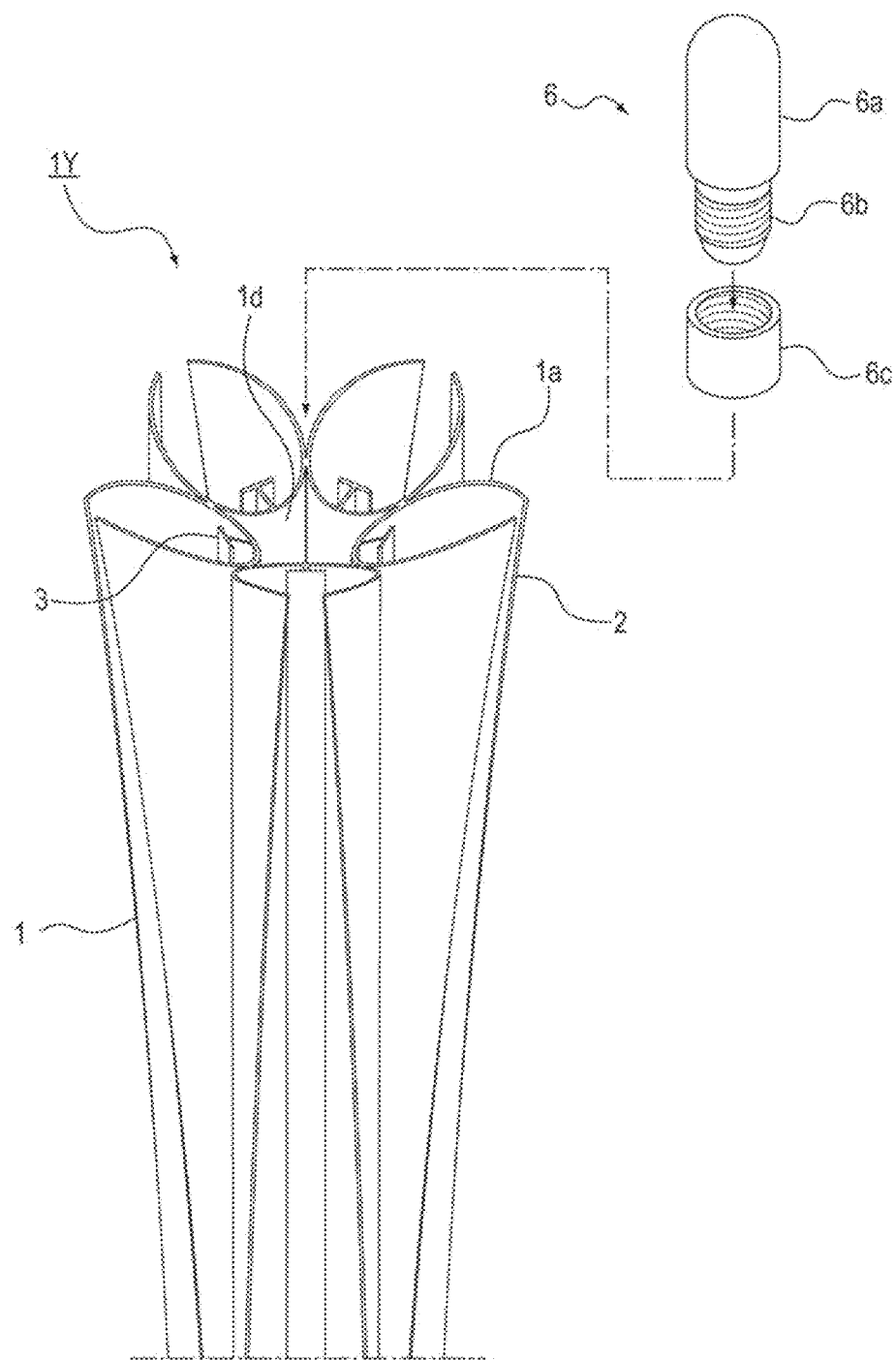
FIG. 5 is an exploded perspective view of a lighting device using the decorative elongated object of the first embodiment of the present invention.

With reference to FIG. 5, a lighting device using the decorative elongated object 1 of the present embodiment will be described. FIG. 5 is a partial perspective view of the upper end of the lighting device with the lighting unit separately illustrated.

A lighting device 1Y is configured by attaching a lighting unit 6 to the cavity 1d at the upper end 1a of the decorative elongated object 1 described above.

The lighting unit 6 includes an LED section 6a for turning ON the light, and a socket 6b for attaching the LED section 6a and supplying power. The socket 6b is fixed in the opening of the cavity 1d by using an adhesive or the like. When the LED section 6a is fitted into the socket 6b, the light of the LED section 6 illuminates the inside of the cylindrical section 2 to provide indirect lighting, so that elegant lighting atmosphere can be provided.

Furthermore, when the decorative elongated object 1 is formed of a metal material such as an aluminum material having a high thermal conductivity, thermal conduction from the LED section 6a is facilitated. Thus, the cylindrical section 2 and the plate section 3 with a large surface area emit heat to function as a heat sink.

Next, variations of shapes of the decorative elongated object of the present invention will be described with reference to FIGS. 6A to 10D. These are diagrams respectively illustrating decorative elongated objects of second to sixth embodiments.

Figure 6A:
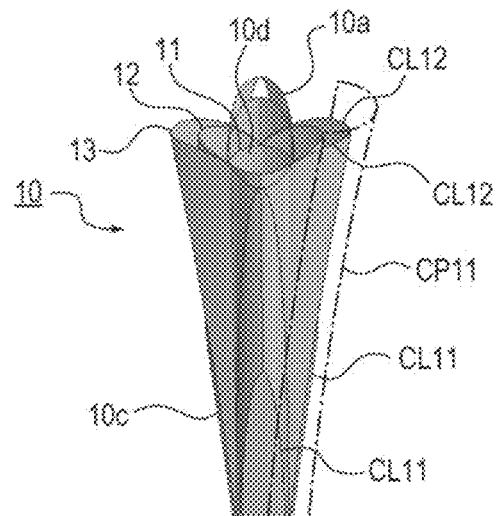
FIGS. 6A to 6D are diagrams illustrating a decorative elongated object of a second embodiment representing a variation in the external appearance design of the present invention.
Figure 6B:
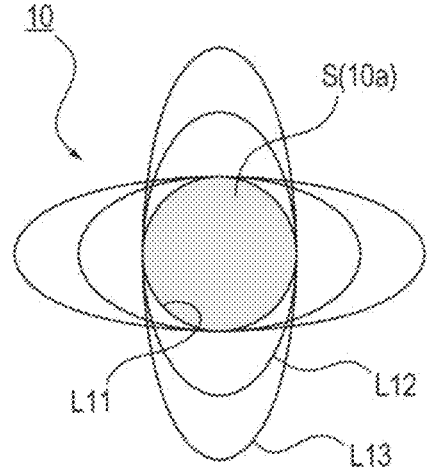

FIGS. 6A to 6D illustrate a decorative elongated object according to a second embodiment of the present invention. As illustrated in FIG. 6B, the decorative elongated object 10 of the present embodiment has a cross section having a space S defined by a closed line L11, and first and second radial lines L12 and L13 extending outward in four directions from the closed line L11. With an elongated material (not illustrated) having this cross section continuing from one end to the other end, the decorative elongated object 10 illustrated in FIG. 6A is manufactured.

Figure 6C:
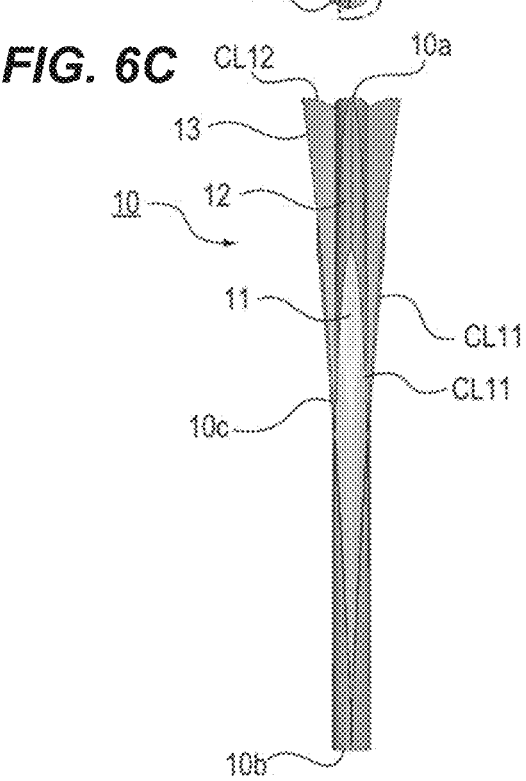
Figure 6D:
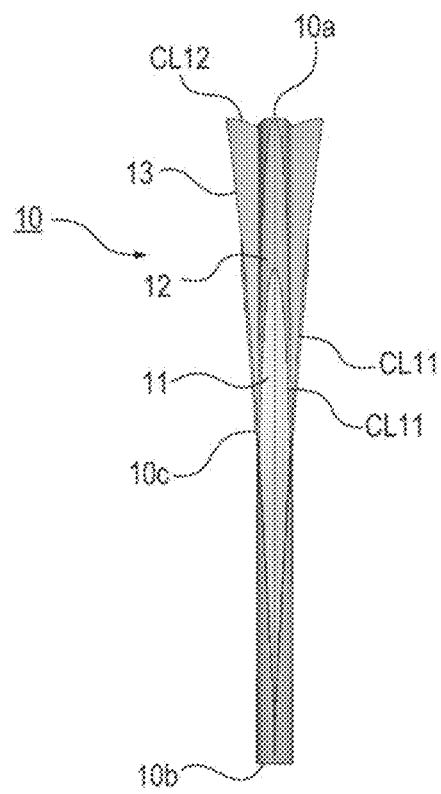

As illustrated in the FIGS. 6A, 6C and 6D, the decorative elongated object 10 of the present embodiment uses the elongated material described above, and the side surface 10c and the upper end 10a thereof are cut and removed along the cutting planes, whereby the cutting lines CL11 appear on the side surface 10c and the cutting lines CL12 appear on the upper end 10a.

The decorative elongated object 10 of the present embodiment thus configured has a main pipe 11 having the cavity 10d at the center, has the first cylindrical sections 12 and the second cylindrical sections 13 extending outward in the four directions therefrom, and has the tapered shape with the upper end 10a being wider than the lower end 10b. As described above, the cutting plane CP11 on the side surface is largely curved, and thus a part of the first cylindrical section 1 protrudes beyond the opening of the second cylinder 13. Furthermore, with an end surface cutting plane (not illustrated) with a conical shape, the upper end is shaped in such a manner that the opening of the cavity 10d has the circumference surrounded by the cylindrical sections 12 and 13, as in the first embodiment.

Figure 7A:
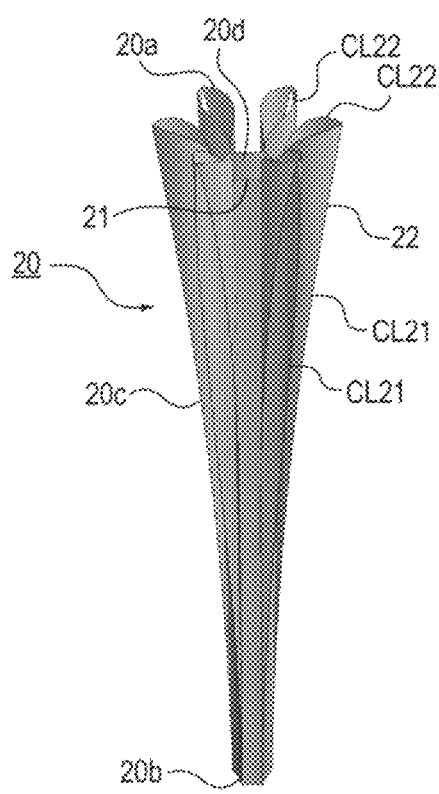
FIGS. 7A to 7D are diagrams illustrating a decorative elongated object of a third embodiment representing a variation in the external appearance design of the present invention.
Figure 7B:
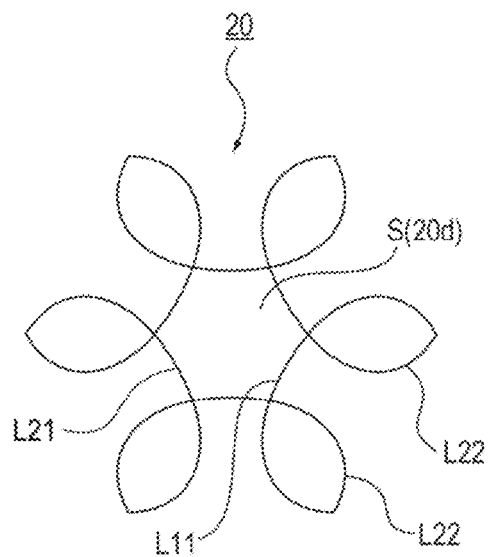

FIGS. 7A to 7D illustrate a decorative elongated object according to a third embodiment of the present invention. As illustrated in FIG. 7B, a decorative elongated object 20 of the present embodiment has a cross section having a space S defined by a closed line L21, and radial lines L22 extending outward in six directions from the closed line L21. With an elongated material (not illustrated) having this cross section shape continuing from one end to the other end, the decorative elongated object 20 illustrated in FIG. 7A is manufactured.

Figure 7C:
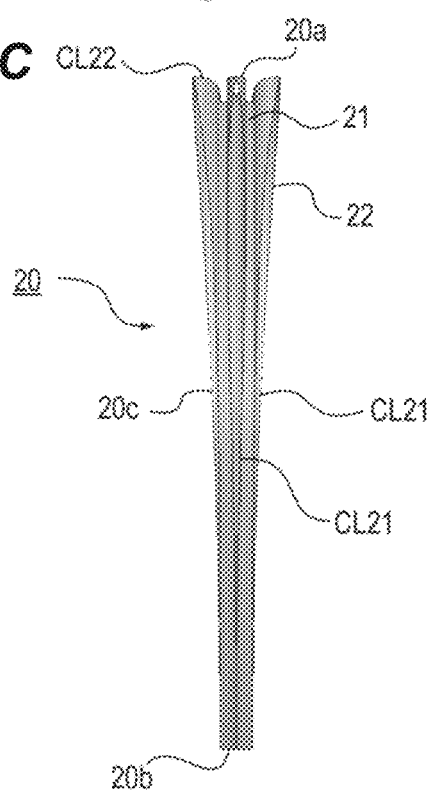
Figure 7D:
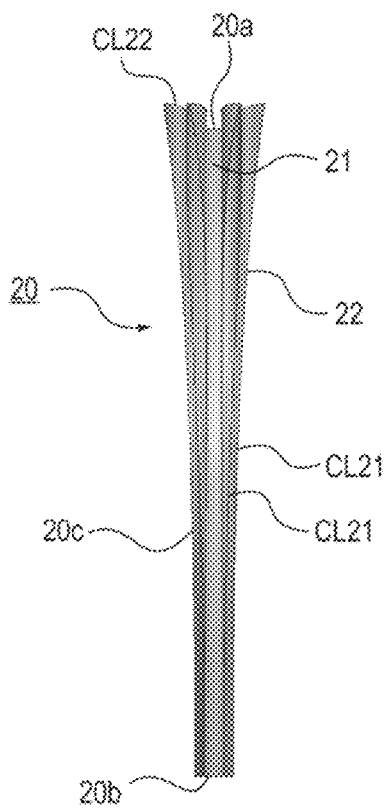

As illustrated in the FIGS. 7A, 7C and 7D, the decorative elongated object 20 of the present embodiment uses the elongated material described above, and the side surface 20c and the upper end 20a thereof are cut and removed along the cutting planes, whereby the cutting lines CL21 appear on the side surface 20c and the cutting lines CL22 appear on the upper end 20a.

The decorative elongated object 20 of the present embodiment thus configured has a main pipe 21 having the cavity 20d at the center, has the cylindrical sections 22 extending outward in the six directions from the circumference thereof, and has a tapered shape with the upper end 20a being wider than the lower end 20b. Furthermore, with an end surface cutting plane (not illustrated) with a conical shape, the upper end is shaped in such a manner that the opening of the cavity 20d has the circumference surrounded by the cylindrical sections 22, as in the first embodiment.

Figure 8A:
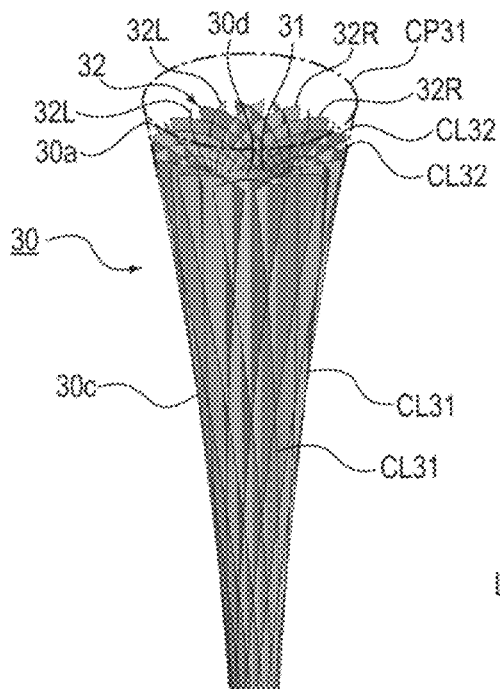
FIGS. 8A to 8D are diagrams illustrating a decorative elongated object of a fourth embodiment representing a variation in the external appearance design of the present invention.
Figure 8B:
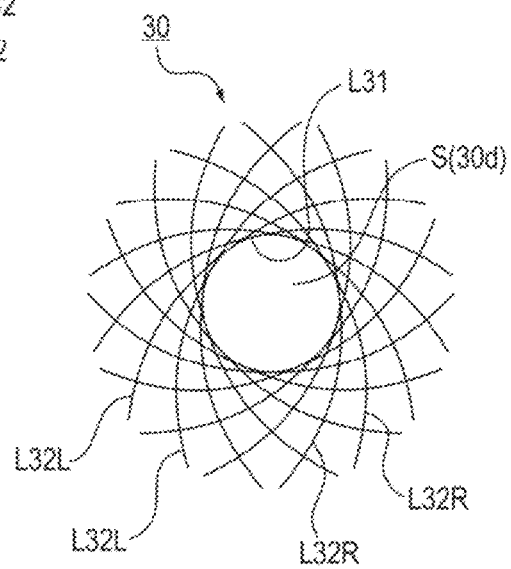

FIGS. 8A to 8D illustrate a decorative elongated object according to a fourth embodiment of the present invention. As illustrated in FIG. 8B, a decorative elongated object 30 of the present embodiment has a cross section having a space S defined by a closed line L31, and radial lines L32R and L32L extending toward multiple sides at an equal interval from the closed line L31. Each adjacent ones of the radial lines L32R and L32L are curved in the opposite directions in the horizontal direction. The radial lines L32R and L32L intersect with each other to form a mesh structure 32. With an elongated material (not illustrated) having this cross section continuing from one end to the other end, the decorative elongated object 30 illustrated in FIG. 8A is manufactured.

Figure 8C:
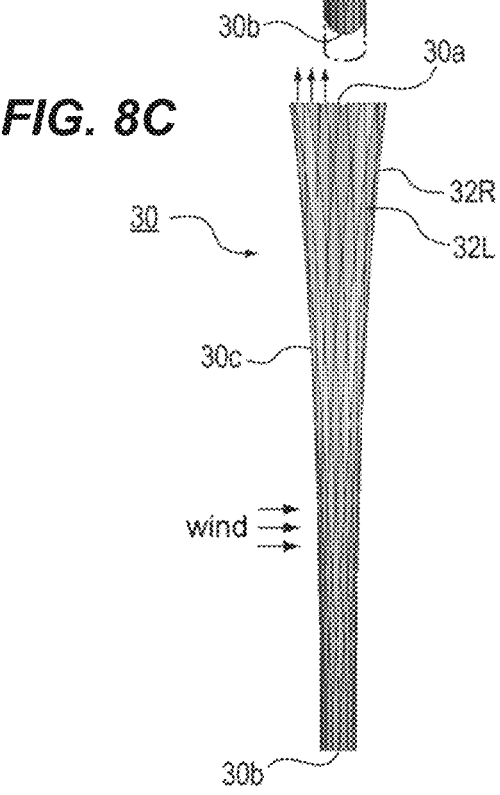
Figure 8D:
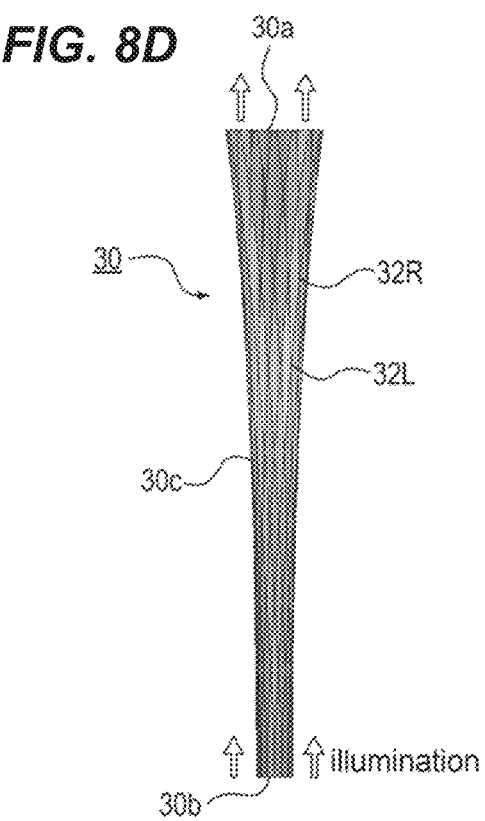

As illustrated in the FIGS. 8A, 8C and 8D, the decorative elongated object 30 of the present embodiment uses the elongated material described above, and the side surface 30c and the upper end 30a thereof are cut and removed along the cutting planes, whereby the cutting lines CL31 appear on the side surface 30c and the cutting lines CL32 appear on the upper end 30a. This side surface cutting plane CP31 has a conical plane as illustrated in the figure.

The decorative elongated object 30 of the present embodiment thus configured has a main pipe 31 having the cavity 30d at the center, has the mesh structure 32 having multiple small cavities on the circumference thereof, and has a tapered shape with the upper end 30a being wider than the lower end 30b. Furthermore, with an end surface cutting plane (not illustrated) with a conical shape, the upper end is shaped in such a manner that the opening of the cavity 30d has the circumference surrounded by the mesh structure 32.

When the decorative elongated object of the present embodiment is used for an Olympic torch, the numerous small cavities of the mesh structure 32 having one end opened on the side surface of the decorative elongated object 30 all have the other ends opened at the upper end 30a of the decorative elongated object 30. Thus, the wind flowing against the side surface 30c while the runner is running flows upward toward the upper end 30a, to contribute to the combustion of the Olympic fire, in addition to the main supply path in the cavity 30d.

Furthermore, when the decorative elongated object of the present embodiment is used for the base material of the lighting device, with the multiple small cavities of the mesh structure 32 all formed in the vertical direction as described above the lighting device can be used for indirect lighting by providing a lighting lamp for upward illumination from the lower end 30b and providing a reflector at the upper end 30a so that light beams pass through the cavities of the mesh structure 32 to reach the reflector.

Figure 9A:
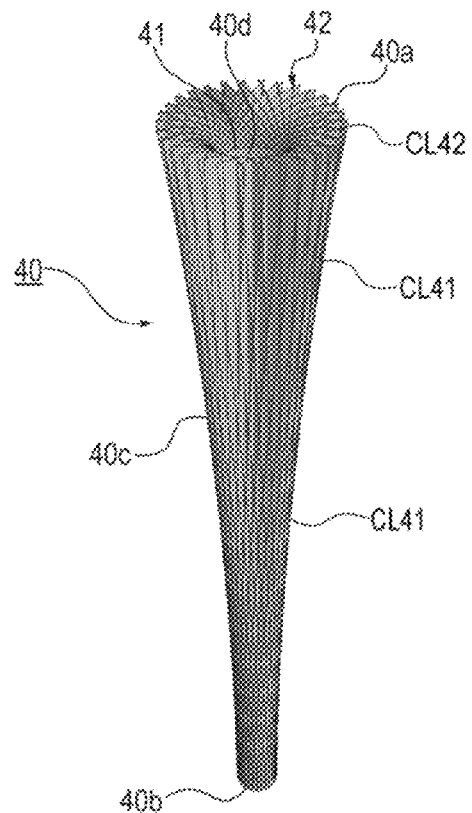
FIGS. 9A to 9D are diagrams illustrating a decorative elongated object of a fifth embodiment representing a variation in the external appearance design of the present invention.
Figure 9B:
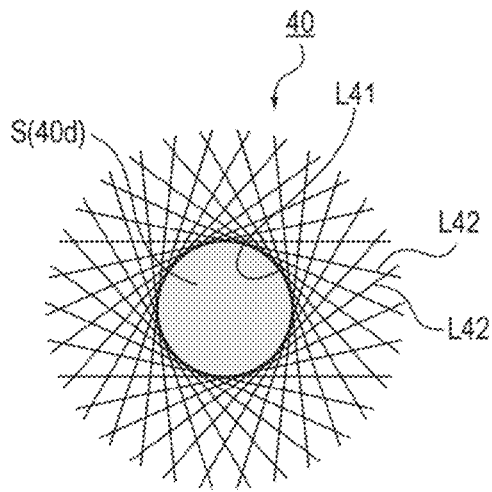

FIGS. 9A to 9D illustrate a decorative elongated object according to a fifth embodiment of the present invention. As illustrated in FIG. 9B, a decorative elongated object 40 of the present embodiment has a cross section having a space S defined by a closed line L41, and radial lines L42 linearly extending outward toward multiple sides from the closed line L41. Adjacent ones of the radial lines L42 extend toward opposite sides to cross each other to form a mesh structure 42. With an elongated material (not illustrated) having this cross section continuing from one end to the other end, the decorative elongated object 40 illustrated in FIG. 9A is manufactured.

Figure 9C:
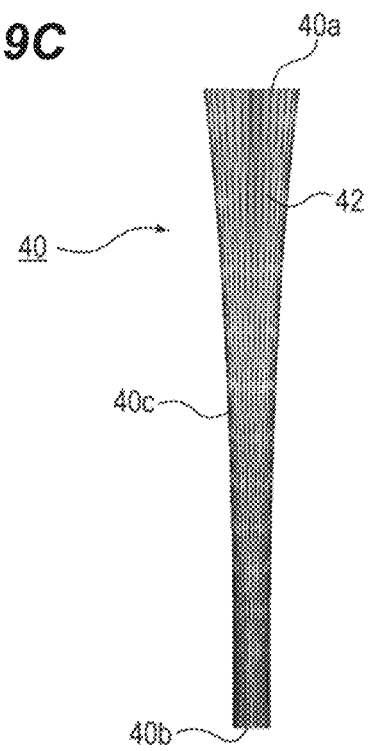
Figure 9D:
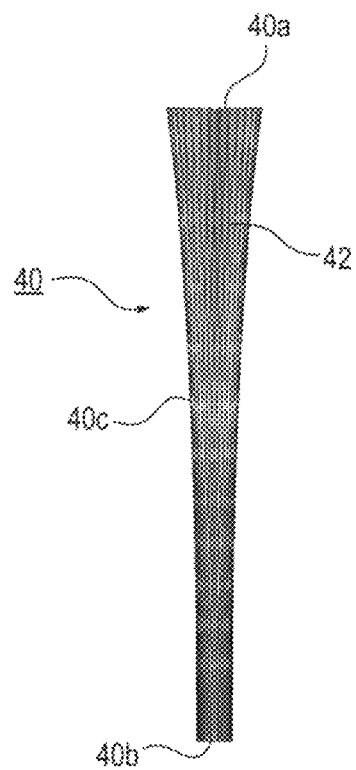

As illustrated in the FIGS. 9A, 9C and 9D, the decorative elongated object 40 of the present embodiment uses the elongated material described above, and the side surface 40c and the upper end 40a thereof are cut and removed along the cutting planes, whereby the cutting lines CL41 appear on the side surface 40c and the cutting lines CL42 appear on the upper end 40a.

The decorative elongated object 40 of the present embodiment thus configured has a main pipe 41 having the cavity 40d at the center, has the mesh structure 42 having multiple small cavities on the circumference thereof, and has a tapered shape with the upper end 40a being wider than the lower end 40b. Furthermore, with an end surface cutting plane (not illustrated) having a conical shape, the upper end is shaped in such a manner that the opening of the cavity 40d has the circumference surrounded by the mesh structure 42, as in the fourth embodiment.

Note that also in a case where the decorative elongated object 40 of the present embodiment is used as a base material for an Olympic torch or a lighting device, the same effect as in the fourth embodiment can be obtained.

Figure 10A:
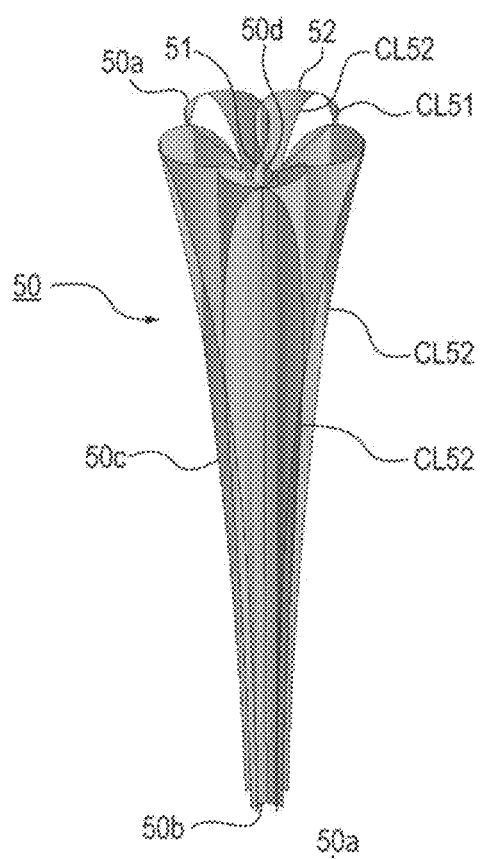
FIGS. 10A to 10D are diagram illustrating a decorative elongated object of a sixth embodiment representing a variation in the external appearance design of the present invention.
Figure 10B:
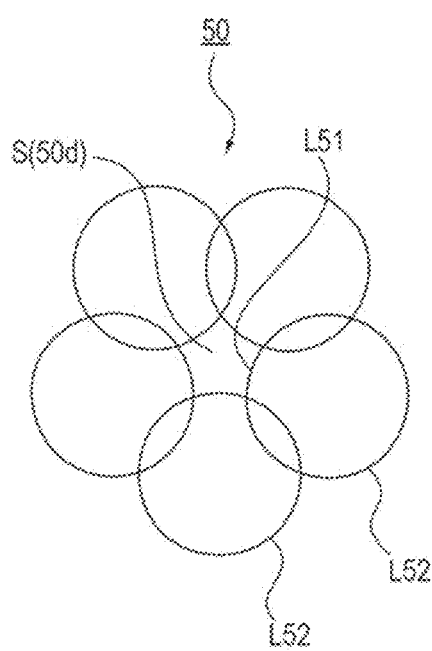

FIGS. 10A to 10D illustrate a decorative elongated object according to a sixth embodiment of the present invention. As illustrated in FIG. 10B, a decorative elongated object 50 of the present embodiment has a cross section having five rings circumferentially arranged, a space S defined by a closed line L51, and radial lines L52 extending outward in 10 directions from the closed line L51 and connected to each other to form the five rings. With an elongated material (not illustrated) having this cross section continuing from one end to the other end, the decorative elongated object 50 illustrated in FIG. 10A is manufactured.

Figure 10C:
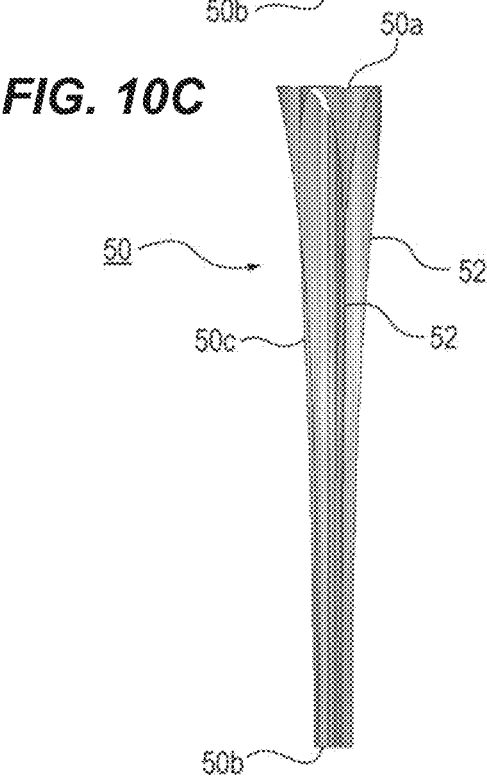
Figure 10D:
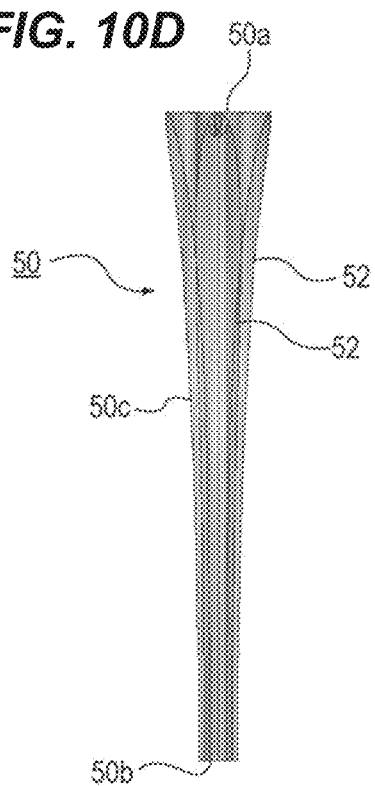

As illustrated in the FIGS. 10A, 10C and 10D, the decorative elongated object 50 of the present embodiment uses the elongated material described above, and the side surface 50c and the upper end 50a thereof are cut and removed along the cutting planes, whereby the cutting lines CL51 appear on the side surface 50c and the cutting lines CL52 appear on the upper end 50a.

The decorative elongated object 50 of the present embodiment thus configured has a pentagonal main pipe 51 having the cavity 50d at the center, has the cylindrical sections 52 extending outward in the five directions from the circumference thereof, and has a tapered shape with the upper end 50a being wider than the lower end 50b. At the upper end, the opening of the cavity 50d is surrounded by the cylindrical sections 52 therearound due to an end surface cutting plane (not illustrated). Still, the cylindrical section 52 is large and the opening defined by the cutting lines 51 of the side surface 50c is large. Thus, the opening of the cavity 50d can be seen from the side surface.

Although the embodiments of the present invention are described above, the present invention is not limited to these, and can employ various configurations. For example, in all of the above embodiments, a cavity is formed by the continuous space defined by the closed line. Alternatively, a configuration without this cavity can be selected. Furthermore, a structure with radial lines extending radially from the center point may be employed. Furthermore, in all of the above embodiments, a symmetrical cross section is employed. Alternatively, an asymmetrical shape may be formed with the cavity displaced from the center.

Furthermore, in the above embodiments, the side surface has an entirely tapered shape. Alternatively, only a part may be tapered with an uncut part remaining. Furthermore, tapered surfaces inclined toward opposite sides in the positive and negative directions so that the center between one end and the other end is constricted.

A material of the elongated material may be selected from materials, including polymer and ceramic, other than metal such as aluminum. In addition, means of molding other than extrusion molding, such as injection molding using a three-dimensional mold may be employed for molding the elongated material.

With the decorative elongated object according to the present invention, cutting and removing of a plurality of radiation lines formed around the closed line are performed along a side surface cutting plane, so that the cross-sectional pattern of the radial lines vary to appear as a decorative pattern on the side surface of the elongated object. By combining various radial line shapes and various cutting angles, various patterns can be provided on the side surface of the elongated object.

Furthermore, with the method for manufacturing a decorative elongated object according to the present invention, an elongated material having a uniform cross section from one end to the other end can be easily manufactured by extrusion molding. Furthermore, through cutting and removing in an angled direction with respect to the side surface of the elongated material, a decorative shape can be provided on the side surface. In particular, the decorative shape of such an elongated object is integrally molded, and is obtained as a structure with higher strength than that obtained with a manufacturing method in which a decorative shape is attached later.

When the decorative elongated object is used for forming an Olympic torch, a highly productive and highly decorative Olympic torch can be obtained because varying decoration can be obtained by simply cutting a molded elongated material. In particular, with the fuel unit fixed to the upper end of the cavity, smooth combustion can be expected to be achieved by the air supplied through the grooves or small cavities formed by the continuous radial lines.

When the decorative elongated object is used for forming a lighting device, a highly productive and highly decorative lighting device can be obtained because varying decoration can be obtained by simply cutting a molded elongated material.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

The invention claimed is:

1. A decorative elongated object comprising an elongated material with a cross section having a plurality of radial lines extending from an inner side toward an outer side, and being uniform from one end to another end, wherein the elongated material has a side surface at least partially tapered to be thinner toward the other end from the one end, with the radial lines partially cut and removed along a side surface cutting plane intersecting with the side surface, and the one end has an end surface being angled toward a space of the end surface.

2. The decorative elongated object according to claim 1, wherein the cross section has a closed line defining the space in a portion at a center of the plurality of radial lines, and the space continues so that a cavity is formed at the center to extend from one end to another end of the elongated object.

3. The decorative elongated object according to claim 1, wherein the elongated material is a material molded by extrusion molding.

4. The decorative elongated object according to claim 1, wherein the end surface at the one end is angled toward a center of the end surface.

5. The decorative elongated object according to claim 1, wherein the side surface cutting plane is curved.

6. The decorative elongated object according to claim 1, wherein the radial lines are formed to be in an annular form or are curved in the cross section.

7. A method for manufacturing a decorative elongated object that is at least partially tapered, the method comprising: molding, by extrusion molding, an elongated material having a cross section having a plurality of radial lines extending from an inner side toward an outer side; cutting and removing a side surface of the elongated material, the cutting being performed in an angled direction with respect to the side surface; and cutting and removing an end surface at one end of the elongated material in an angled direction toward a space of the end surface.

8. The method for manufacturing a decorative elongated object according to claim 7, wherein the cross section has a closed line defining the space in a portion at a center of the plurality of radial lines, and the space continues so that a cavity is formed at the center to extend from one end to another end of the elongated element.

9. The method for manufacturing a decorative elongated object according to claim 7, wherein the radial lines are formed to be in an annular form or are curved in the cross section.

10. The method for manufacturing a decorative elongated object according to claim 7, wherein the cutting and removing the end surface include cutting and removing in an angled direction toward the center of the end surface.

11. The method for manufacturing a decorative elongated object according to claim 7, wherein the side surface is cut in a direction curved with respect to a horizontal or vertical direction.

12. An Olympic torch comprising: the decorative elongated object according to claim 1; and a fuel unit that lights Olympic fire, the fuel unit being fixed at the one end of the decorative elongated object.

13. A lighting device comprising: the decorative elongated object according to claim 1; and a lighting unit that turns on light, the light unit being fixed at the one end of the decorative elongated object.

* * * * *